March 21, 1967 H. DITKOFSKY 3,310,688
ELECTRICAL CIRCUITS
Filed May 7, 1964
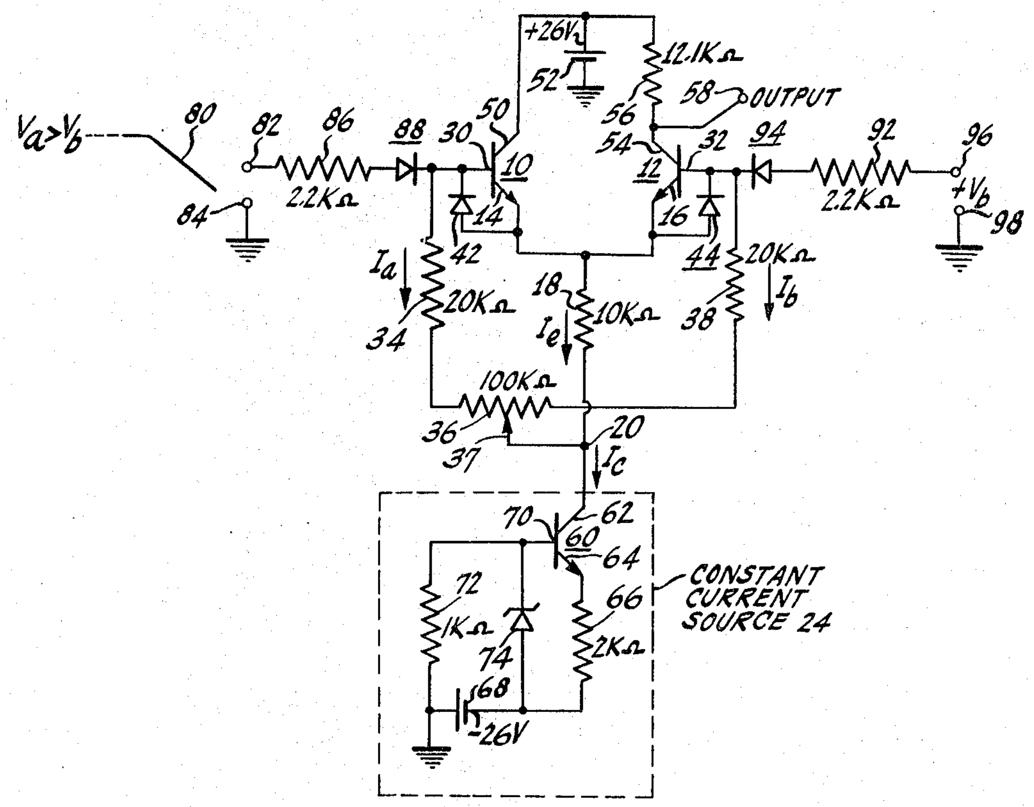
INVENTOR.
HARRY DITKOFSKY
BY John V. Regan
Attorney 3,310,688
ELECTRICAL CIRCUITS Harry Ditkofsky, Cherry Hill, N.J., assignor to Radio Corporation of America, a corporation of Delaware Filed May 7, 1964, Ser. No. 365,681
8 Claims. (Cl. 307—88.5)

This invention relates to electrical circuits and, in particular, to an improved circuit for comparing two voltages and for producing an output signal when the two voltages have a predetermined amplitude relationship.

Voltage comparators are used, among other things, for timing purposes in scanning systems such as optical character readers and radar ranging systems. A voltage ramp may be applied as one input voltage to the circuit, and either a voltage level or a second voltage ramp may be apliedp as the other input. The circuit generally is arranged to produce an output signal upon equality of the input voltages, and the time of occurrence of the output signal is used as a measure of some variable quantity such as distance, position, etc.

It frequently happens that the output signal must be transmitted through several stages before it reaches its final destination. The destination may be, for example, a control circuit that terminates the ramp voltage in response to the output signal. Due to inherent delays in the various stages and/or transmission path, the ramp voltage may have moved past the point of equality with the other input voltage before the output signal reaches its destination. An offset voltage can be used in the comparator to compensate for delays and for tolerances in circuit components. Even where there is no appreciable delay involved, an offset voltage also can be used when it is desired to signal the occurrence of a predetermined relationship in the input voltage amplitudes other than equality.

In differential amplifier type voltage comparators employing transistors, one prior art method of providing an adjustable offset voltage is to connect a potentiometer between the emitter electrodes, with a common resistor connected to the arm of the potentiometer. Because the resistance of the potentiometer reduces the circuit gain, the resistance of the potentiometer should have a relatively small value. This necessarily limits the range of possible offset voltages. An offset voltage can be provided by supplying a bias to one of the base electrodes. However, the value of the offset voltage may vary with the level at which the comparison is made, unless the current flow through the bias resistor is maintained constant independent of the input voltage.

It is one object of this invention to provide a voltage comparison circuit that has provision for a relatively large offset voltage in either polarity direction.

It is another object of this invention to provide an improved voltage comparison circuit that has an offset voltage which does not vary with the voltage level at which a comparison is made.

It is a further object of this invention to provide a variable in magnitude, that does not affect the gain of the circuit.

These objects are achieved by a pair of amplifying devices having control, output and common electrodes. The series combination of a resistor and a source of substantially constant current is connected, in that order, between the common and output electrodes of each amplifying device. The two control electrodes are connected by way of resistance means, with a point on the resistance means being connected to the current source. In the preferred form of the circuit, the resistance means comprises a potentiometer having its movable arm connected to the constant current source. The two voltages being compared are coupled to different ones of the input electrodes, and a seperate unidirectional conducting device is connected between the control and common electrodes of each emplifying device.

In the sole figure of the drawing there is shown a pair of amplifying devices 10, 12 having output, control and common electrodes. In particular, amplifying devices may be transistors, as shown, in which the output, control and common electrodes are collector, base and emitter electrodes, respectively. The emitter electrodes 14, 16 of the two devices are connected together and by way of a common emitter resistor 18 to a point 20. A source of substantially constant current, located within the dashed box 24, is connected between point 20 and a point of reference potential indicated by the conventional symbol for circuit ground. The base electrodes 30, 32 of the transistors 10, 12 are connected together by way of resistance means, shown as a resistor 34, a potentiometer resistor 36 and a resistor 38 serially connected, in that order, between base electrode 30 and base electrode 32. Potentiometer 36 has a movable arm that is connected at the point 20 between resistor 18 and the constant current source.

Transistor 10 has a unidirectional conducting device, which may be diode 42, connected across its emitter-base junction and poled to conduct current in a direction which is opposite the direction of easy current flow across the emitter-base junction. Second transistor 12 has a similar unidirectional conducting device 44 connected across its emitter 16-base 32 junction and poled to pass current in a direction opposite the easy current flow direction across that junction. Collector electrode 50 of transistor 10 is directly connected to the positive terminal of a source of bias potential, illustrated as a battery 52 having its negative terminal grounded. The other collector electrode 54 is connected to the positive terminal of battery 52 by way of a supply resistor 56. An output terminal 58 is connected at the collector electrode 54.

Current source 24, which supplies a current $I_c$ of substantially constant value at point 20, comprises an NPN transistor 60 having a collector 62 connected to point 20, and an emitter 64 connected through a resistor 66 to the negative terminal of a battery 68. The positive terminal of battery 68 is grounded. The base electrode 70 of transistor 60 is connected by way of a resistor 72 to circuit ground, and is connected by way of a substantially constant voltage device 74 to the negative terminal of battery 68. Constant voltage device 74 may be, for example, a Zener type diode poled in a direction to be reverse-biased by battery 68. Battery 68 has a value to bias the Zener diode 74 in its constant voltage region, whereby a fixed forward bias is applied at the base electrode 70 of transistor 60. The base bias potential and emitter resistor 66 determine the current in the collector 62 circuit substantially independently of the collector 62 voltage. The negative base bias permits the collector 62 voltage to go above or below ground potential.

A first input voltage, illustrated as being a voltage ramp 80, is applied at a first input terminal 82. An input coupling circuit comprising the series combination of a resistor 86 and a unidirectional conducting device, shown as a diode 88, is connected between input terminal 82 and the base 30 of first transistor 50. A similar input coupling arrangement comprising a resistor 92 and a unidirectional conducting diode 94 is connected between the base electrode 32 of second transistor 12 and a second input terminal 96. A second voltage, which may be considered a reference voltage, is applied at input terminal 96 and is assumed, for illustrative purposes, to be a voltage level having a magnitude $+V_b$ which is less positive than the upper level $V_a$ of the voltage ramp 80.

The upper level $V_a$ of voltage ramp 80 is selected to be sufficiently positive relative to $+V_b$ to cause first transistor 10 to be conducting and second transistor 12 to be nonconducting at the start of the voltage ramp 80. First transistor 10 remains conducting to the exclusion of second transistor 12 until the ramp voltage 80 falls to a value which has a predetermined amplitude relationship to the "reference" voltage $+V_b$. When that value is reached, second transistor 12 turns on and its collector current flowing through resistor 56 produces a voltage drop which appears as a signal at output terminal 58. The amplitude relationship of the input voltages at the instant second transistor 12 begins conducting is determined by the setting of the potentiometer arm 37. That is to say, second transistor 12 turns on when there is a predetermined or selected difference, which may be zero, between the input voltages, and this difference is determined by the setting of arm 37. This difference in voltage is the "offset voltage" mentioned previously. Because of the circuit configuration, the potentiometer 36, once adjusted, provides a fixed offset voltage that is independent of the absolute values of the applied input voltages and, in particular, is independent of the absolute value of the "reference" voltage $+V_b$. These and other features of the circuit will now be discussed in greater detail.

At the beginning of a cycle of operation, the input ramp 80 voltage has a value of $+V_a$ volts. Input diode 88 is forward biased, first transistor 10 is conducting, and second transistor 12 is nonconducting. The voltage at emitter electrode 14 is slightly less positive than the base 30 voltage by an amount equal to the relatively small drop across the forwardly biased emitter 14-base 30 junction, and will be assumed for convenience of discussion to have the same value as the base 30 voltage. Because the emitter 14 and base 30 are connected by resistors to the same point 20, the voltage drop across common emitter resistor 18 is equal to the sum of the voltage drops across base resistor 34 and that portion of potentiometer 36 to the left of arm 37. The same voltage appears also across the series combination of base resistor 38 and that portion of the potentiometer 36 to the right of arm 37, neglecting the small drop across forwardly biased diode 44, which may be of the same order as the drop across the emitter 14-base 30 junction of first transistor 10. The substantially constant current $I_c$ is distributed in a fixed ratio among these three resistance paths according to the ratio of the impedances in those paths. This ratio, in turn, is determined by the setting of potentiometer arm 37.

Because the current paths are all connected at a common point 20 and have fixed resistances, the voltage drops across the paths remain equal and fixed, independent of the value of voltage ramp 80. The voltage at common point 20 shifts with a change in the ramp voltage to maintain the aforementioned relationship. It will be recalled that the constant current $I_c$ is independent of the voltage at collector electrode 62.

Let it be assumed that the potentiometer arm 37 is positioned at the far right end of potentiometer 36. For the resistance values given in the drawing, there is then a resistance of 120 kilohms between base electrode 30 and point 20, a resistance of 20 kilohms between base electrode 32 and point 20, and a resistance of 10 kilohms between the common emitters 14, 16 and point 20. Assuming that the constant current $I_c$ has a value of 3⅙ milliamperes, by way of example, a current $I_e=2$ milliamperes flows through emitter resistor 18, a current $I_a=1/6$ milliampere flows through base resistor 34 and potentiometer 36, and a current $I_b=1$ milliampere flows through base 38. When transistor 10 alone is conducting, the current $I_e$ flows through the collector-emitter path of transistor 10 and common emitter resistor 18 to the point 20, neglecting the small base 30 input current. The current $I_b$ also flows through the collector-emitter path of transistor 10 and through forwardly biased diode 44 and base resistor 38 to point 20. Current $I_a$ flows from input terminal 82 through resistor 86, diode 88 and resistors 34 and 36 to point 20.

Neglecting diode voltage drops for convenience of discussion, it may be seen that the voltage at input terminal 82 is approximately 20.37 volts more positive than the voltage at point 20 when a current $I_a=1/6$ milliamperes flows through the resistors 86 and 34 and potentiometer 36, and this voltage difference is a constant regardless of the value of the ramp 80 voltage. As the ramp 80 voltage falls in value, the voltage at point 20 also falls in value by approximately the same amount. Since $I_b$ is constant, the base 32 voltage follows the change in input voltage at terminal 82. Input diode 94 remains reverse biased, and second transistor 12 remains nonconducting until the voltage at base electrode 32 becomes less positive than $+V_b$ by a predetermined amount.

In order to turn on second transistor 12, its emitter 16-base 32 junction becomes forward biased, and shunt diode 44 becomes nonconducting. The current $I_b=1$ milliampere flows from input terminal 96 through resistor 92, diode 94, and resistor 38 to the point 20. For the particular values of resistance given in the drawing, the voltage $+V_b$ will be approximately 22.2 volts positive relative to the voltage at point 20 at the instant second transistor 12 turns on, when arm 37 is at the right hand end of potentiometer resistor 36. Stated in another way second transistor 12 turns on when the ramp 80 voltage falls to a value that is about 1.83 volts negative relative to the reference voltage $+V_b$. The circuit thus has an offset voltage of 1.83 volts.

When second transistor 12 first turns on, both transistors 10, 12 are conducting and both shunt diodes 42, 44 are nonconducting. The currents $I_a$ and $I_b$ flow from their respective terminals 82, 96 to common point 20. The emitter current $I_e$, previously flowing only through first transistor 10, now divides between the two transistors 10, 12 and an output signal, due to the voltage drop across resistor 56, appears at output terminal 58. If the ramp 80 voltage continues to fall in value, input diode 88 becomes reverse-biased and first transistor 10 turns off. Turn-off is rapid, relatively speaking, because first transistor 10 is not operated in saturation. When first transistor 10 turns off, the shunt diode 42 becomes forward biased and both of the currents $I_a$ and $I_e$ flow through second transistor 12.

The offset voltage, given as 1.83 volts in the foregoing example, is a function of the setting of arm 37. By reasoning similar to that in the given example, it can be shown that second transistor 12 will turn on when the ramp 80 voltage is 1.83 volts more positive than $+V_b$ if the arm 37 is moved to its left-most position. Thus, both positive and negative offset voltages are possible. Also, any offset voltage, including zero, within the range of $-1.83$ volts to $+1.83$ volts can be provided by an appropriate intermediate setting of arm 37. It will be understood that the above-mentioned range of offset voltage values is for the particular resistance values and constant current value described, and that a different range of possible offset voltages may be provided by selecting different component and/or constant current values.

Although the circuit has been described as operating with a fixed reference voltage level $+V_b$ at input terminal 96 and a voltage ramp at terminal 82, it should be noted that a fixed voltage could be applied at input terminal 82 and a ramp voltage could be applied at terminal 96. Also, both of the input voltages could be ramps. For example, the input at terminal 82 could be the negative going ramp 80 illustrated, and a positive going ramp could be applied at input terminal 96.

Although the preferred circuit has been illustrated as employing NPN type transistors, it will be understood that PNP type transistors also could be used, provided that the usual changes are made in the polarities of the voltages and in the various diode connections.

What is claimed is:

1. The combination comprising:

first and second amplifying devices each having output, control and common electrodes;

means including the series combination of a resistance element and a source of substantially constant current connected, between the common and output electrodes of each of said amplifying devices;

resistance means connected between the control electrodes of the first and second amplifying devices;

means connecting a point on said resistance means to a point on said series combination between the resistance element and the current source;

first and second unidirectional conducting devices each being connected between the control and common electrodes of a different one of said amplifying devices, each unidirectional conducting device being poled to conduct current in the same direction, relative to the common electrode of the associated amplifying device, as the direction of current flow through said resistance element;

first and second input terminals; and coupling means connected between each of said input terminals and the control electrode of a different one of said amplifying devices.

2. The combination comprising:

a pair of transistors each having collector, base and emitter electrodes;

means including the series combination of a resistance element and a source of substantially constant current connected, between the emitter and collector electrodes of each of said transistor devices;

resistance means connected between the base electrodes of the pair of transistors;

means connecting a point on said resistance means to a point on said series combination between the resistance element and the current source;

first and second unidirectional conducting devices each being connected between the base and emitter electrodes of a different one of said transistors, each unidirectional conducting device being poled to conduct current in the same direction, relative to the emitter electrode of the associated transistor, as the direction of current flow through said resistance element;

first and second input terminals; and coupling means connected between each of said input terminals and the base electrode of a different one of said amplifying devices.

3. The combination comprising:

first and second amplifying devices each having output, control and common electrodes;

means including the series combination of a resistance element and a source of substantially constant current connected in the order named, between the common and output electrodes of each of said amplifying devices;

resistance means connected between the control electrodes of the first and second amplifying devices;

means connecting a point on said resistance means to a point on said series combination between the resistance element and the current source;

first and second unidirectional conducting devices each being connected between the control and common electrodes of a different one of said amplifying devices, each unidirectional conducting device being poled to conduct current in the same direction, relative to the common electrode of the associated amplifying device, as the direction of current flow through said resistance element;

first and second input terminals; and coupling means connected between each of said input terminals and the control electrode of a different one of said amplifying devices.

4. The combination comprising:

first and second amplifying devices each having output, control and common electrodes;

means including the series combination of a resistance element and a source of substantially constant current connected, in the order named, between the common and output electrodes of each of said amplifying devices;

resistance means connected between the control electrodes of the first and second amplifying devices;

means connecting a point on said resistance means to a point on said series combination between the resistance element and the current source;

first and second unidirectional conducting devices each being connected between the control and common electrodes of a different one of said amplifying devices, each unidirectional conducting device being poled to conduct current in the same direction, relative to the common electrode of the associated amplifying device, as the direction of current flow through said resistance element;

first and second input terminals; and a resistor and a unidirectional conducting device connected between each of said input terminals and the control electrode of a different one of said amplifying devices.

5. The combination comprising:

first and second amplifying devices each having output, control and common electrodes;

means including the series combination of a resistance element and a source of substantially constant current connected, in the order named, between the common and output electrodes of each of said amplifying devices;

a potentiometer connected between the control electrodes of the first and second amplifying devices, said potentiometer having a movable arm;

means connecting said arm to a point on said series combination between the resistance element and the current source;

first and second unidirectional conducting devices each being connected between the control and common electrodes of a different one of said amplifying devices, each unidirectional conducting device being poled to conduct current in the same direction, relative to the common electrode of the associated amplifying device, as the direction of current flow through said resistance element;

first and second input terminals; and coupling means connected between each of said input terminals and the control electrode of a different one of said amplifying devices.

6. The combination comprising:

first and second amplifying devices each having output, control and common electrodes;

means including the series combination of a resistance element and a source of substantially constant current connected, in the order named, between the common and output electrodes of each of said amplifying devices;

resistance means connected between the control electrodes of the first and second amplifying devices;

means connecting a point on said resistance means to a point on said series combination between the resistance element and the current source;

first and second unidirectional conducting devices each being connected between the control and common electrodes of a different one of said amplifying devices, each unidirectional conducting device being poled to conduct current in the same direction, relative to the common electrode of the associated amplifying device, as the direction of current flow through said resistance element;

first and second input terminals;

coupling means connected between each of said input terminals and the control electrode of a different one of said amplifying devices;

means for applying input voltages, to be compared, at said input terminals; and output means connected to the output electrode of at least one of said amplifying devices.

7. The combination comprising:

first and second transistors each having collector, base and emitter electrodes;

means including the series combination of a resistance element and a source of substantially constant current connected, in the order named, between the emitter and collector electrodes of each of said transistors;

resistance means connected between the base electrodes of the first and second transistors;

means connecting a point on said resistance means to a point on said series combination between the resistance element and the current source;

first and second unidirectional conducting devices each being connected between the base and emitter electrodes of a different one of said transistors, each unidirectional conducting device being poled to conduct current in a direction opposite the direction of easy current flow across the emitter-base junction of the associated transistor;

first and second input terminals; and coupling means connected between each of said input terminals and the base electrode of a different one of said amplifying devices.

8. The combination comprising:

first and second transistors of the same conductivity type each having collector, base and emitter electrodes;

means including the series combination of a resistance element and a source of substantially constant current connected, in the order named, between the emitter and collector electrodes of each of said transistors;

a potentiometer connected between the control electrodes of the first and second amplifying devices and having a movable contact arm;

means connecting said arm to a point on said series combination between the resistance element and the current source;

first and second unidirectional conducting devices each being connected between the base and emitter electrodes of a different one of said transistors, each unidirectional conducting device being poled to conduct current in a direction opposite the direction of easy current flow across the emitter-base junction of the associated transistor;

first and second input terminals; and coupling means connected between each of said input terminals and the base electrode of a different one of said amplifying devices.

References Cited by the Examiner

UNITED STATES PATENTS

| | | | |
|---|---|---|---|
| 2,779,872 | 1/1957 | Patterson | 328—146 X |
| 3,054,910 | 9/1962 | Bothwell | 307—88.5 |
| 3,260,857 | 7/1966 | Weber | 307—88.5 |

ARTHUR GAUSS, *Primary Examiner.*

D. D. FORRER, *Assistant Examiner.*

UNITED STATES PATENT OFFICE

CERTIFICATE OF CORRECTION

Patent No. 3,310,688 March 21, 1967

Harry Ditkofsky

It is hereby certified that error appears in the above numbered patent requiring correction and that the said Letters Patent should read as corrected below.

Column 1, line 18, for "apliedp" read -- applied --; line 41, after "common" insert -- emitter --; line 60, after "a", second occurrence, insert -- voltage comparison circuit having an offset voltage, --; column 2, line 5, for "emplifying" read -- amplifying --; line 26, after "be" insert -- a --; column 3, line 72, after "base" insert -- resistor --; column 5, line 53, column 7, line 34, and column 8, line 26, for "amplifying devices", each occurrence, read -- transistors --.

Signed and sealed this 7th day of November 1967.

(SEAL)

Attest:

Edward M. Fletcher, Jr.

Attesting Officer

EDWARD J. BRENNER

Commissioner of Patents